United States Patent
Colley et al.

(10) Patent No.: US 6,650,644 B1
(45) Date of Patent: Nov. 18, 2003

(54) METHOD AND APPARATUS FOR QUALITY OF SERVICE TRANSLATION

(75) Inventors: Tom Colley, Boxborough, MA (US); Joe Kidder, Arlington, MA (US); Larry Manor, Londonderry, NH (US); Terry Pearson, Hollis, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/314,570

(22) Filed: May 19, 1999

Related U.S. Application Data (60) Provisional application No. 60/086,078, filed on May 20, 1998.

(51) Int. Cl.[7] .............................................. H04L 12/28
(52) U.S. Cl. .................................. 370/395.21; 370/465
(58) Field of Search ................................. 370/229, 230, 370/230.1, 235, 395.2, 395.21, 401, 465, 466, 467, 412, 413, 398, 389, 395.32, 397, 392, 409, 474, 395.3

(56) References Cited

U.S. PATENT DOCUMENTS

| | | | | | |
|---|---|---|---|---|---|
| 6,104,700 | A | * | 8/2000 | Haddock et al. | 370/235 |
| 6,104,713 | A | * | 8/2000 | Nagami et al. | 370/392 |
| 6,188,698 | B1 | * | 2/2001 | Galand et al. | 370/412 |
| 6,222,844 | B1 | | 4/2001 | Han et al. | |
| 6,252,857 | B1 | * | 6/2001 | Fendick et al. | 370/254 |
| 6,259,699 | B1 | * | 7/2001 | Opalka et al. | 370/398 |
| 6,304,578 | B1 | * | 10/2001 | Fluss | 370/413 |

* cited by examiner

*Primary Examiner*—Dang Ton
*Assistant Examiner*—Phuc Tran
(74) *Attorney, Agent, or Firm*—Blakely Sokoloff Taylor & Zafman LLP

(57) ABSTRACT

A method, apparatus and article of manufacture for translating the quality of service (QOS) of a data packet. An incoming type of service (TOS) mask word is generated, and a QOS lookup table is generated. A TOS value is generated by masking a header field of the data packet with the TOS mask. The QOS lookup table is searched for a QOS translation using the TOS value as a key value. An internal service class (ISC) indicator is output according to the QOS translation entry.

12 Claims, 6 Drawing Sheets

METHOD AND APPARATUS FOR QUALITY OF SERVICE TRANSLATION

CROSS-REFERENCES TO RELATED APPLICATIONS

This application claims the benefit of U.S. Provisional Application No. 60/086,078 entitled "Big Access Concentrator" filed May 20, 1998.

FIELD OF THE INVENTION

This invention relates generally to computer networks, and more particularly, to a method and apparatus for quality of service (QOS) translation.

BACKGROUND OF THE INVENTION

In the field of data routing in computer networks, an Internet service provider (ISP) user typically has much more stringent requirements than an enterprise user because the routers will be subjected to the adverse Internet routing environment in the world. There are three typical architectural requirements that such routers must support, described below.

A. Stable Operation. Although it sounds trivial, the notion of stable operation has been elusive in the ISP community, as witnessed by various Internet "brown-outs" since it's inception. One paper on Internet scaling "Scaling the Internet during the T3 NSFNET Years", C. Villamizar, Oct. 22, 1997, articulates the basic requirements which ISPs demand from their networking equipment in order to provide a stable network. In addition to forwarding performance and scaling requirements, ISPs typically expect several operational attributes, given below.

1. Stability under adverse conditions. The router must remain stable and deterministic under arbitrarily high traffic loads or a flood of routing update changes.
2. Low packet loss to stable destinations. The effects of unstable routes (flapping) should not impact a router's ability to forward traffic to stable routes.
3. Reasonable fairness and congestion control. Sufficient buffering capacity, avoidance of head-of-line blocking, advanced queuing algorithms, and sophisticated discard techniques must be provided.

B. Service Differentiation. Recently it has become clear that service providers cannot make adequate margins by offering flat-rate access and undifferentiated service. The ability to offer tiered services, and to guarantee service levels, is crucial to the economic and competitive health of ISPs. The airline industry's first-class, business-class and coach-class offerings provide a meaningful analogy for Internet service differentiation: a small number of customers are willing to pay for premium service, if it can be guaranteed. The concentrator's must enable ISPs to offer differentiated services based on multiple queues and advanced, intelligent Traffic Management features.

C. Superior Reliability. ISP routers must provide a greater level of reliability and availability than known router architectures. Part of this flows from designing with stability in mind, but providing additional fault tolerance features adds another dimension of resiliency. ISP routers should be designed without any single points of failure, and all software designs should incorporate fault isolation principles.

Currently, there is no single, standard, agreed upon method for communicating QOS/class of service information in Internet Protocol (IP) data packets. Therefore, there is a need for a way to translate a QOS data packet into an incoming type of service data packet.

SUMMARY OF THE INVENTION

The present invention provides a method, apparatus and article of manufacture for translating the quality of service (QOS) of a data packet. An incoming type of service (TOS) mask word is generated, and a QOS lookup table is generated. A TOS value is generated by masking a header field of the data packet with the TOS mask. The QOS lookup table is searched for a QOS translation using the TOS value as a key value. An internal service class (ISC) indicator is output according to the QOS translation entry.

BRIEF DESCRIPTION OF THE DRAWINGS

The disclosed technology is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of an embodiment, reference is made to the accompanying drawings which form a part hereof, and in which is shown by way of illustration a specific embodiment in which the disclosed technology may be practiced. It is to be understood that other embodiments may be utilized and structural changes may be made without departing from the scope of the disclosed technology. An embodiment of the disclosed technology, described below, enables a remote computer system user to execute a software application on a network file server.

The present invention provides a method, apparatus and article of manufacture for translating the QOS of a data packet. An incoming TOS mask word is generated, and a QOS lookup table is generated. A TOS value is generated by masking a header field of the data packet with the TOS mask. The QOS lookup table is searched for a QOS translation using the TOS value as a key value. An ISC indicator is output according to the QOS translation entry.

Hardware Environment

Figure 1:
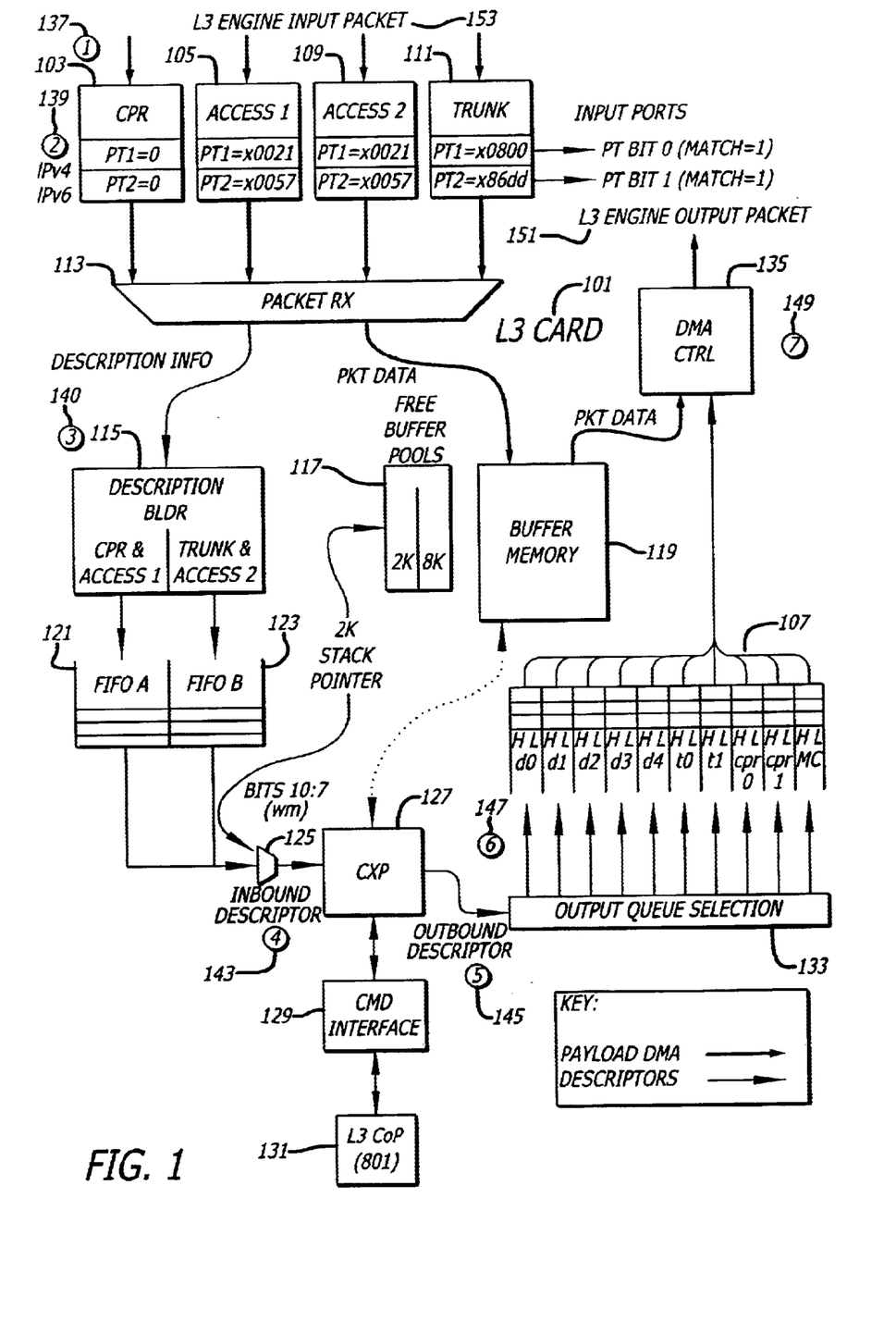
FIG. 1 shows a block diagram of an L3 card forwarding path compatible with the present invention.

FIG. 1 illustrates a data path of a packet through a hardware environment compatible with the disclosed technology. At step 137, packets 153 enter the L3 card 101 from the access cards 105, 109, trunk card 111, and central process and resource (CPR) 103 cards. At step 139, inbound descriptor information is obtained from the received packet 113 as it is transferred into buffer memory 119 having a free buffer pool 117. The packet type field is compared with PT1 and PT2 type registers, with the PT bits set according. At step 141, an inbound descriptor 115 is built by combining the CPR 103 and trunk card 111 information. In one embodiment, a channel identifier, control information, and a data packet length is passed directly to the inbound descriptor 115. The CPR 103 descriptor information is forwarded to a FIFO A memory 121 and the trunk card 111 information is forwarded to a FIFO B memory 123. At step 143, the inbound descriptor 125 is read by a route switch processor (CXP) 127 and processed with the help of a command interface 129 and a L3 coprocessor 131. At step 145, an outbound descriptor is written by the CXP 127 to an output queue selector 133. At step 147, the descriptor is directed to the appropriate outbound queue 107. At step 149, the outbound descriptor is used to direct packet re-generation from a DMA controller 135 to a destination 151, and free a buffer in buffer memory 119 back to the free buffer pool 117.

To summarize, the CXP 127 reads an inbound descriptor 125, determines the packet's destination via IP Protocol destination address lookup, builds the packet outbound descriptor for packet transmission, and writes the outbound descriptor to the appropriate channel,outbound queue 133 for transmission from a DMA controller 135 to a destination 151.

Buffer Memory

Figure 2:
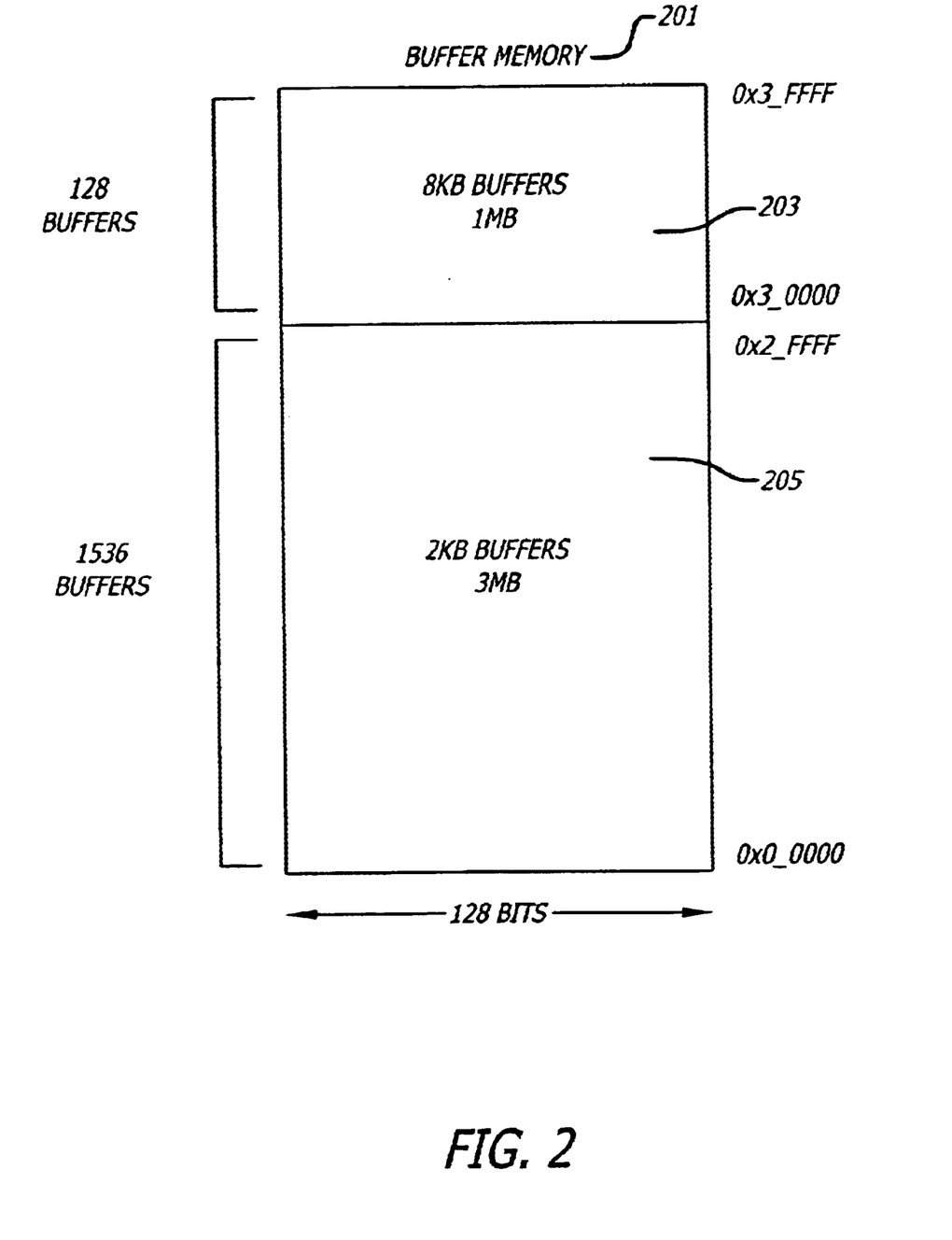
FIG. 2 shows a buffer pool division compatible with the present invention.

Incoming packets 153 are transferred directly from the access cards 105, 109, trunk card 111, and CPR 103 cards into the L3P buffer memory 119. An example structure of a typical 4 MB buffer memory 119, 201 is shown in FIG. 2, where one MB of memory is divided in to 8 KB buffers 203, and 3 MB of memory is divided into 2 KB buffers 205. A data packet is allocated to a buffer from the 2 K or 8 K buffer pool as indicated by the length received in the first word of the data packet. Any packet longer than 1536 bytes will be allocated an 8 K byte buffer. If the system is unable to allocate a buffer from the appropriate free buffer pool, the incoming packet is dropped indiscriminately prior to any attempt for proper QOS classification. Therefore, in order to ensure proper QOS operation, packet discard at this point should be avoided.

The 4 MB buffer memory 119, 201, is preferably divided into one or two pools of fixed size buffers, as described above. Two supported sizes are 2 KBytes and 8 Kbytes, but it will be recognized by one of ordinary skill in the art that other buffer sizes may be used without loss of generality. The division between these two pools is under software control. For example, the entire 4 MB can be allocated to all 2 KB buffers and vice versa, or different portions can be allocated to each pool.

The pointers to the buffers in the 2 KB pool and 8 KB pool are maintained in two separate stack memories. Each stack memory can hold up to 8K−1 (or 8191) buffer pointers and typically has a 13-bit stack pointer. The stack pointer always points to the top of the stack. When the Stack Pointer points to the location 0, it indicates that the buffer pool is empty. The content of the stack pointer always represents the number of available buffers in that pool.

To put a buffer pointer on the stack, the stack pointer is advanced by one and then a new buffer pointer is written. To pop a buffer pointer from the stack, the buffer pointer on top of the stack is read and then the stack pointer is subtracted by one.

Watermark Generation

In one embodiment of the disclosed technology, bits 9, 8, and 7 of the 2 KB Stack Pointer are used as watermark indicator. These bits provide eight priority buckets as shown in Table 1 below.

TABLE 1

Buffer Pool Watermark.

| Watermark | Number of Buffers |
| --- | --- |
| 000 | 0 to 127 |
| 001 | 128 to 255 |
| 010 | 256 to 383 |
| 011 | 384 to 511 |
| 100 | 512 to 639 |
| 101 | 640 to 767 |
| 110 | 768 to 895 |
| 111 | >895 |

To ensure accurate and timely buffer pool level indication, the watermark bits at the time of the CXP 127 inbound descriptor 125 read are fed into the inbound descriptor 125. The CXP 127 uses these bits to drop packets by freeing up buffers during periods of congestion.

Figure 3:
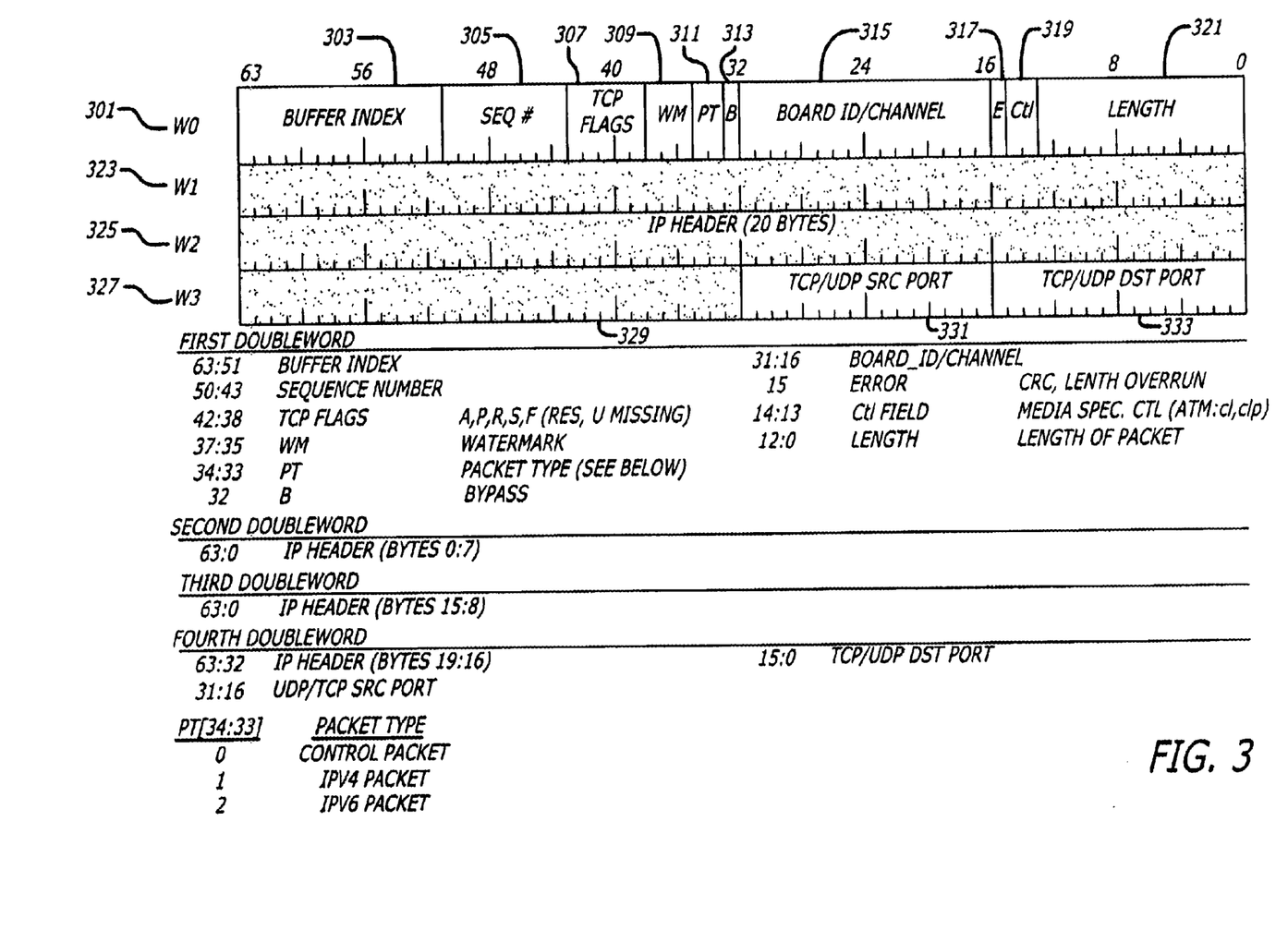
FIG. 3 shows an inbound descriptor format compatible with the present invention.

In FIG. 3, an embodiment of the first four words of an inbound descriptor is shown. Word 301 contains a buffer index 303, a sequence number 305, TCP flags 307, a watermark indicator 309, a packet type 311, a bypass indicator 313, a board ID/channel field 315, an error field 317, a control field 319, and a packet length field 321. Words 323, 325, and 327 contain the 20 byte IP header 329. Word 327 also contains a TCP/UDP source port field 331, and a TCP/UDP destination port field 333.

The format and meaning of the watermark indicator 309 is given in Table 1 above. The watermark indicator 309 is used in conjunction with an ISC and a drop preference bit (DP) to determine when to drop a packet, as shown in Table 2 below.

TABLE 2

Congestion Clip Table.

| ISC | DP | Watermark (WM) |
| --- | --- | --- |
| 7 | 0 | 7, 6, 5, 4, 3, 2, 1 |
| 7 | 1 | 7, 6, 5, 4, 3 |
| 6 | 0 | 7, 6, 5, 4, 3, 2 |
| 6 | 1 | 7, 6, 5, 4 |
| 5 | 0 | 7, 6, 5, 4, 3 |
| 5 | 1 | 7, 6, 5 |
| 4 | 0 | 7, 6, 5, 4 |
| 4 | 1 | 7, 6 |
| 3 | 0 | 7, 6, 5 |
| 3 | 1 | 7 |
| 2 | 0 | 7, 6 |
| 2 | 1 | 7 |
| 1 | 0 | 7, 6 |
| 1 | 1 | 7 |
| 0 | 0 | 7 |
| 0 | 1 | 7 |

The disclosed technology tags an inbound descriptor 125 with the three bit: watermark indicator 309 as they are read by the CXP 127. The three watermark bits of the watermark indicator 309 indicate the current congestion level of the buffer memory 119 and free buffer pool 117. As various thresholds are crossed, the drain rate for the input FIFO A memory 121 and FIFO B memory 123 is increased by discarding lower priority data packets.

QOS Classification/Policing

In one embodiment of the disclosed technology, classification and policing are accomplished either implicitly from a TOS Octet in the IP header 329, or explicitly as determined by filtering in specific packet attributes configured by the user. The result of the classification is a 3 bit (8 level) ISC and a drop preference bit (DP). This 4 bit value is used exclusively within the disclosed technology to make QOS related determinations.

Figure 4:
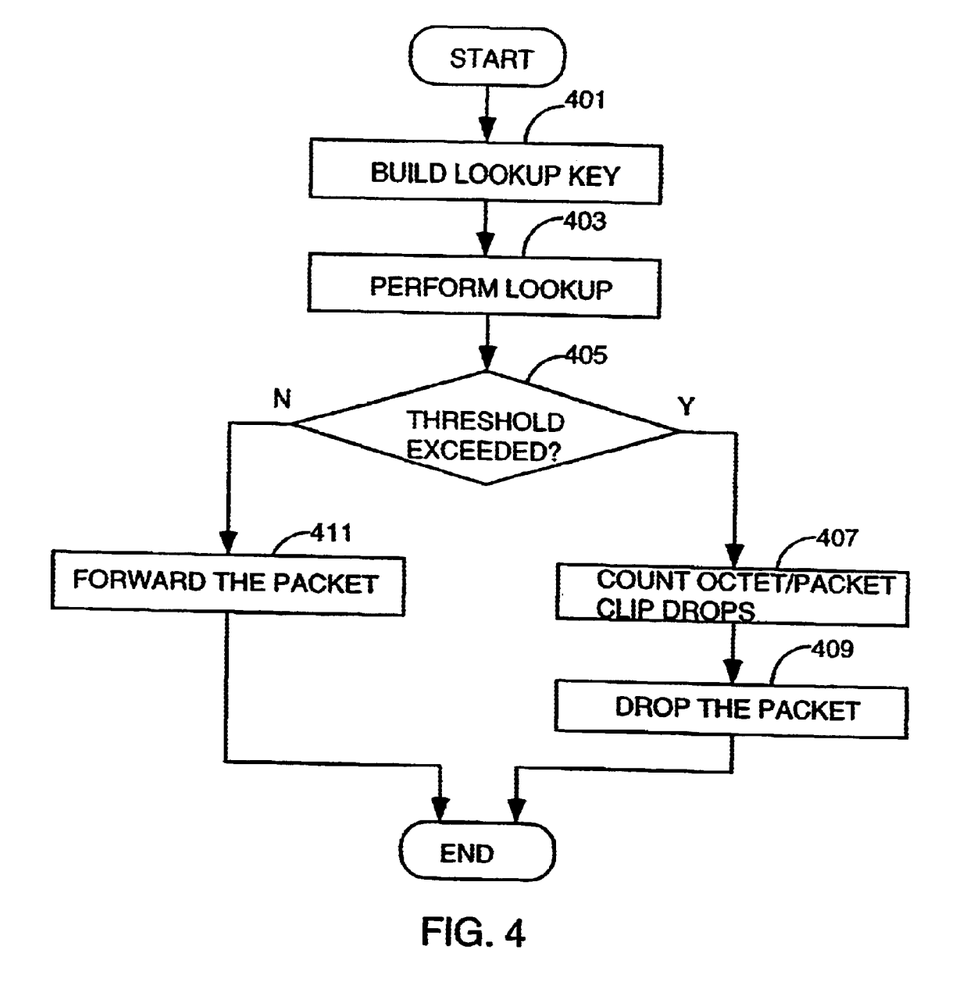
FIG. 4 shows a flow diagram of a method for discarding and forwarding data packets compatible with the present invention.

The policing algorithm shown in FIG. 4 uses user programmable parameters to determine if the traffic rate being received has exceeded the rate of the traffic contract. In certain situations it is desirable to re-classify packets as determined from their traffic utilizations. In these cases the ISC/DP values may be modified during policing operations. At step 401, a lookup key is built using the ISC, DP and watermark values. At 403, a lookup is performed. If at step 405, a threshold is exceeded, at step 407 the number of octet/packet clip drops is counted, and the packet is dropped at step 409. Otherwise, at step 411 the packet is forwarded to the packet destination.

QOS Congestion Management

In order to differentiate between contracted service levels there should be traffic management mechanisms in place to ensure that higher precedence traffic has a better chance of making it through the concentrator than best effort traffic, especially in the case of system congestion. This system congestion is indicated by low resources in the free buffer pool 117. It is desirable to ensure 'premium' class traffic over 'best effort'.

In order to make an intelligent choice on which packets to discard and which to keep, at least three parameters are evaluated: 1) the severity of the resource shortage, indicated by watermark bits 309 in the inbound descriptor 125, 2) the ISC of the packet, and 3) the DP indication, a traffic rate exceeding its committed information rate (CIR) may be subject for quick discard. The CXP 127 performs this evaluation by concatenating the ISC, DP, and WM values into a key for a lookup into a configurable congestion clip table, an example of which is shown above in Table 2. The lookup will either 'hit', indicating the packet continues to be forwarded, or 'miss' in which case the packet is discarded or 'clipped'.

Figure 5:
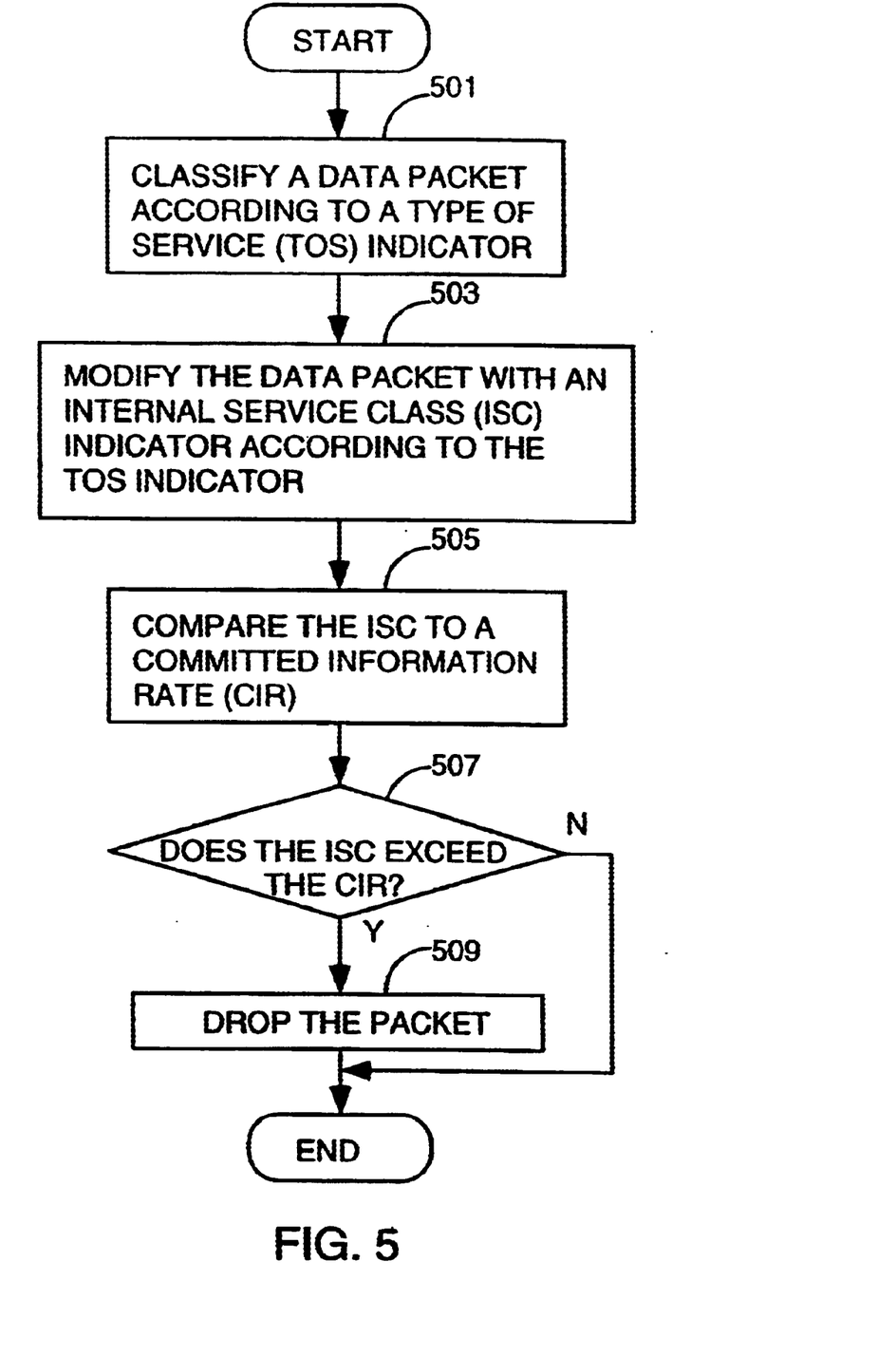
FIG. 5 shows a flow diagram of a method for discarding data packets compatible with the present invention.

FIG. 5 shows an example flow diagram of a method for discarding data packets. At step 501, a data packet is classified according to a TOS indicator. At step 503, the data packet is modified with an ISC indicator according to the TOS indicator. At step 505, the ISC is compared to a CIR. If at step 507 the ISC exceeds the CIR, the data packet is dropped at step 509.

It is desirable that in these congested scenarios that the lesser precedence packets can be dropped at a rate fast enough to allow for higher precedence packets to continue to be forwarded and also to drain the inbound descriptor queues (FIFO A memory 121 and FIFO B memory 123) in order to replenish the free buffer pool 117.

QOS Translation

One embodiment of the disclosed technology supports a configurable mapping function which allows users to specify an encoding used in a network which can then be appropriately decoded and translated while the system is in operation. TOS fields are preferably mapped on a per-interface basis. For an example multi-user environment with equipment from multiple vendors, on ingress, a TOS field and a precedence field are mapped from a first vendor encoding to an internal encoding. On egress, the internal encoding is mapped to a second vendor specific encoding for subsequent transmission.

In one embodiment of the disclosed technology, the IP header of a data packet contains a 8-bit QOS field which provides a definition of the quality of service for that data packet. Typically, the 8-bit QOS field may be divided into a 3-bit precedence segment and a 5-bit TOS segment, but it will be recognized by one of ordinary skill in the art that the size, number, and type of divisions of the QOS field may be modified without loss of generality. A 256 entry lookup table is used to translate the 8-bit QOS field into a 3-bit ISC and a 1-bit drop preference (DP) bit. An example partial receive translation table illustrating an 8-bit QOS to 4-bit ISC translation is given below in Table 3.

TABLE 3

| Receive translation table. | | | |
|---|---|---|---|
| QOS Byte | Mask | ISC | DP |
| 00000000 | --11---- | 0 | 0 |
| 00010000 | --11---- | 3 | 0 |
| 00100000 | --11---- | 6 | 1 |
| 00110000 | --11---- | 7 | 1 |

Once internal processing of the data packet is complete, the 4-bit ISC value contained in the data packet header is translated back to an external QOS value. A 256 entry lookup table is used to translate the 4-bit ISC to an 8-bit QOS value. An example partial transmit translation table illustrating a 4-bit ISC to an 8-bit QOS translation is given below in Table 4.

TABLE 4

| Transmit translation table. | | | |
|---|---|---|---|
| ISC | DP | QOS Byte | Mask |
| 0 | 0 | 00000000 | --11---- |
| 3 | 0 | 00010000 | --11---- |
| 6 | 1 | 00100000 | --11---- |
| 7 | 1 | 00110000 | --11---- |

In both the receive and transmit translation tables, a mask word is used to isolate significant bits within the TOS or DP segments of the QOS byte. Typically, all non-masked bits are not modified within the header of the data packet. It will be recognized by one of ordinary skill in the art that different mask words other than those shown in Table 3 and Table 4 may be used to isolate different bits within the QOS byte. It will be further recognized that the mask word may be eliminated altogether, and that the QOS byte can simply be used directly for the TOS and DP fields.

Figure 6:
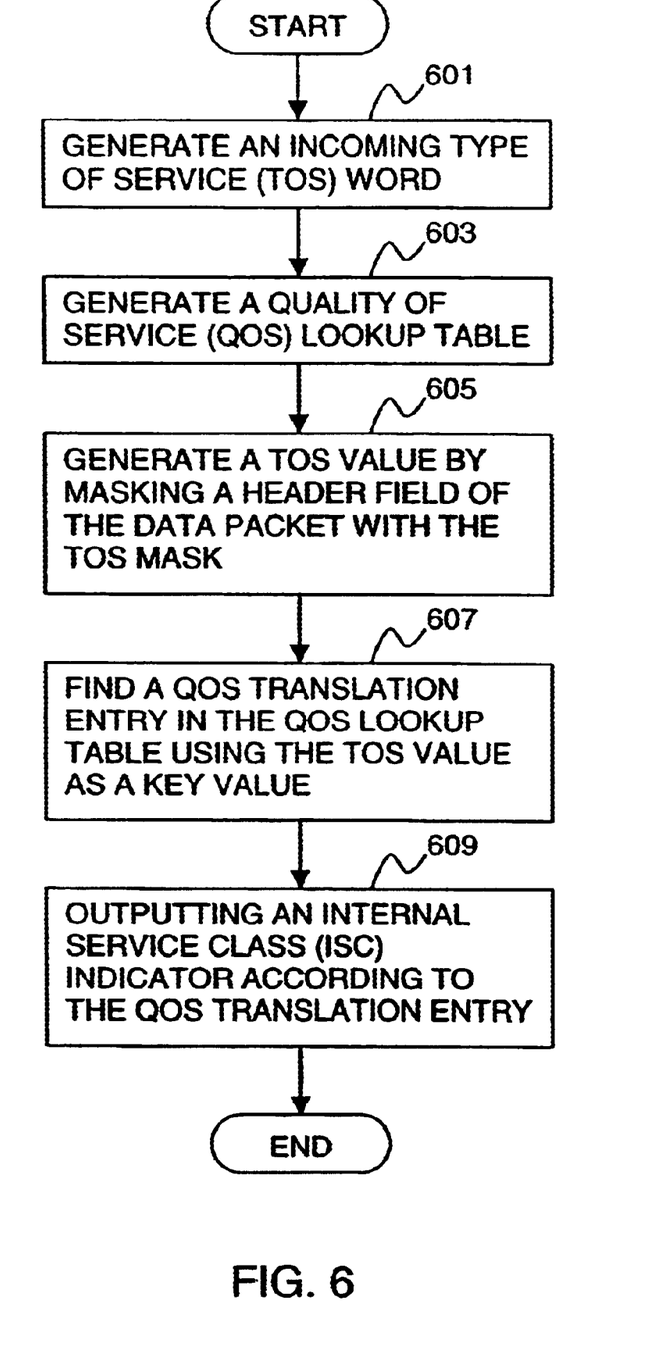
FIG. 6 shows a flow diagram of a method for translating the QOS of a data packet compatible with the present invention.

FIG. 6 shows an example flow diagram of a method for translating the QOS of a data packet. At step 601, an incoming TOS mask word is generated. At step 603, a QOS lookup table is generated. At step 605, a TOS value is generated by masking a header field of the data packet with the TOS mask. At step 607, a QOS translation entry is located in the QOS lookup table using the TOS value as a key value. At step 609, an ISC indicator is output according to the QOS translation entry.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for translating a quality of service (QOS) of a data packet comprising:
generating an incoming type of service (TOS) mask word;
generating a QOS lookup table;
generating a TOS value by masking a header field of the data packet with the TOS mask word;
finding a QOS translation entry in the QOS lookup table using the TOS value as a key value; and
outputting an internal service class (ISC) indicator according to the QOS translation entry.

2. The method of claim 1 wherein the TOS value comprises 3-bit precedence segment and a 5-bit TOS segment masked from an 8-bit QOS field in the header field of the data packet.

3. A method for translating a quality of service (QOS) of a data packet comprising:
generating a type of service (TOS) lookup table;
obtaining an internal service class (ISC) indicator from the data packet;
finding a TOS translation entry in the TOS lookup table using the ISC Indicator as a key value; and
outputting a TOS indicator according to the TOS translation entry.

4. The method for translating a quality of service (QOS) of a data packet comprising:
generating a type of service (TOS) lookup table:
obtaining an internal service class (ISC) indicator from the data packet, the ISC indicator comprising a 3-bit ISC and a 1-bit drop preference (DP) bit:
finding a TOS translation entry in the TOS lookup table using the ISC indicator as a key value; and
outputting a TOS indicator according to the TOS translation entry.

5. An apparatus for translating a quality of service (QOS) of a data packet comprising:
a mask word generator to generate an incoming type of service (TOS) mask word;
a lookup table generator logically coupled to the mask word generator to generate a QOS lookup table;
a TOS value generator logically coupled to the lookup table generator to generate a TOS value by masking a header field of the data packet with the TOS mask word;
a comparator logically coupled to the TOS value generator to compare a QOS translation entry in the QOS lookup table to the TOS value; and
a outputter logically coupled to the comparator to output an ISC indicator according to the QOS translation entry.

6. The apparatus of claim 5 wherein the TOS value comprises 3-bit precedence segment and a 5-bit TOS segment generated by masking an 8-bit QOS field In the header field of the data packet.

7. An apparatus for translating the quality of service (QOS) of a data packet comprising:
a lookup table generator to generate a type of service (TOS) lookup table;
an ISC value generator logically coupled to the lookup table generator to generate an internal service class (ISC) indicator from the data packet;
a comparator logically coupled to the lookup table generator to compare a TOS translation entry in the TOS lookup table to the ISC indicator value; and
an outputter logically coupled to the comparator to output a TOS indicator according to the TOS translation entry.

8. An apparatus for translating a quality of service (QOS) of a data packet comprising:
a lookup table generator to generate a type of service (TOS) lookup table:
an ISC value generator logically coupled to the lookup table generator to generate an internal service glass (ISC) indicator from the data packet, the ISC indicator comprising a 3-bit ISC and a 1-bit drop preference (DP) bit;
a comparator logically coupled to the lookup table generator to compare a TOS translation entry in the TOS lookup table to the ISC indicator; and
an outputter logically coupled to the comparator to output a TOS indicator according to the TOS translation entry.

9. An article of manufacture for use in a computer system to translate a quality of service (QOS) of a data packet, the article of manufacture comprising a computer usable medium having computer readable program code means embodied in the medium, the program code means including:
computer readable program code means embodied in the computer usable medium for causing a computer to generate an incoming type of service (TOS) mask word;
computer readable program code means embodied in the computer usable medium for causing a computer to generate a QOS lookup table;
computer readable program code means embodied in the computer usable medium for causing a computer to generate a TOS value by masking a header field of the data packet with the TOS mask word;
computer readable program code means embodied in the computer usable medium for causing a computer to find a QOS translation entry in the QOS lookup table using the TOS value as a key value; and
computer readable program code means embodied in the computer usable medium for causing a computer to output an ISC indicator according to the QOS translation entry.

10. The article of manufacture of claim 9 wherein the TOS value comprises 3-bit precedence segment and a 5-bit TOS segment generated by masking an 8-bit OOS field in the header field of the data packet.

11. An article of manufacture for use in a computer system to translate a quality of service (QOS) of a data packet, the article of manufacture comprising a computer usable medium having computer readable program code means embodied In the medium, the program code means including:
computer readable program code means embodied in the computer usable medium for causing a computer to generate a type of service (TOS) lookup table;
computer readable program code means embodied in the computer usable medium for causing a computer to obtain an internal service class (ISC) indicator from the data packet;
computer readable program code means embodied in the computer usable medium for causing a computer to find a TOS translation entry in the TOS lookup table using the ISC indicator as a key value; and
computer readable program code means embodied in the computer usable medium for causing a computer to output a TOS indicator according to the TOS translation entry.

12. An article of manufacture for use in a computer system to translate the a quality of service (QOS) of a data packet, the article of manufacture comprising a computer usable medium having computer readable program code means embodied in the medium, the program code means including:

computer readable program code means embodied in the computer usable medium for causing a computer to generate a type of service (TOS) lookup table;

computer readable program code means embodied in the computer usable medium for causing a computer to obtain an internal service class (ISC) indicator from the data packet, the ISC indicator a 3-bit ISC and a 1-bit drop preference (DP) bit;

computer readable program code means embodied in the computer usable medium for causing a computer to find a TOS translation entry in the TOS lookup table using the ISC indicator as a key value; and     computer readable program code means embodied in the computer usable medium for causing a computer to output a TOS indicator according to the TOS translation entry.

\* \* \* \* \*